United States Patent [19]

Komatsu et al.

[11] Patent Number: 5,113,339

[45] Date of Patent: May 12, 1992

[54] DATA PROCESSOR FOR DETECTING IDENTICAL DATA SIMULTANEOUSLY COEXISTING IN A PLURALITY OF DATA SECTIONS OF DATA TRANSMISSION PATHS

[75] Inventors: Koji Komatsu, Tenri; Shinichi Yoshida, Kashihara; Souichi Miyata, Nara; Daisuke Azuma, Tenri, all of Japan

[73] Assignee: Sharp Kabushiki Kaisha, Osaka, Japan

[21] Appl. No.: 260,061

[22] Filed: Oct. 20, 1988

[30] Foreign Application Priority Data

| Oct. 20, 1987 | [JP] | Japan | 62-265734 |
| Oct. 20, 1987 | [JP] | Japan | 62-265736 |
| Oct. 20, 1987 | [JP] | Japan | 62-265737 |
| Oct. 20, 1987 | [JP] | Japan | 62-265741 |
| Oct. 29, 1987 | [JP] | Japan | 62-265735 |

[51] Int. Cl.⁵ .......................... G06F 7/04; G06F 7/20; G06F 13/00
[52] U.S. Cl. .................................. 395/200; 364/221.9; 364/232.22; 364/240; 364/253.1; 364/265.1; 364/927.92; 364/927.93; 364/927.94; 364/935.4; 364/948.34; 364/DIG. 1; 364/DIG. 2; 371/68.2
[58] Field of Search ... 364/200 MS File, 900 MS File; 371/68.2

[56] References Cited

U.S. PATENT DOCUMENTS

| 4,145,733 | 3/1979 | Misunas et al. | 364/200 |
| 4,495,565 | 1/1985 | Thompson | 364/200 |
| 4,918,644 | 4/1990 | Terada et al. | 364/900 |
| 4,943,916 | 7/1990 | Asano et al. | 364/200 |

OTHER PUBLICATIONS

Pramanik et al; "A Hardware Pattern matching Algorithm on a dataflow"; The Computer Journal, vol. 28, No. 3, 1985; pp. 264-269.
Technical Report of the Institute of Electronic and Communication Engineers of Japan (1983) SSD 83-78, pp. 45-52.

*Primary Examiner*—Thomas C. Lee
*Assistant Examiner*—Krisna Lim
*Attorney, Agent, or Firm*—Birch, Stewart, Kolasch & Birch

[57] ABSTRACT

So-called template matching processing is function-distributed into a pre-detecting portion and a template matching portion, processing in the respective portions being achieved by a hardware circuit. In the pre-detecting portion, the relationship between data which simultaneously exist in the determined comparing sections on data transmission paths, and matching processing is performed in advance with respect to data to be matched. The template matching portion includes an addressing type general-purpose memory and performs main processing of template matching based on the result of the comparison and determination in the pre-detecting portion.

2 Claims, 13 Drawing Sheets

DATA PROCESSOR FOR DETECTING IDENTICAL DATA SIMULTANEOUSLY COEXISTING IN A PLURALITY OF DATA SECTIONS OF DATA TRANSMISSION PATHS

BACKGROUND OF THE INVENTION

1. Field of the Invention

The present invention relates to a data processor, and more particularly, to an apparatus for determining the relationship between a plurality of data to perform template matching.

2. Description of the Prior Art

In a conventional von-Neumann computer, various instructions are stored in advance as programs in a program memory, and addresses in the program memory are sequentially specified by a program counter so that the instructions are sequentially read out. Thereafter, the instructions are executed.

On the other hand, a data flow type information processor is one of a non von-Neumann type computer having no concept of sequential execution of instructions by a program counter. Such a data flow type information processor employs architecture based on parallel processing of instructions. In the data flow type information processor, immediately after data which are objects of an operation are collected, an instruction can be executed. Further, a plurality of instructions are simultaneously driven by the data, so that programs are executed in parallel in accordance with the natural flow of the data. As a result, it is considered that the time required for the operation is significantly reduced.

FIG. 1 is a block diagram showing one example of a structure of a conventional data flow type information processor to which the present invention is applied. In addition, FIG. 2 is a diagram showing one example of a field structure of a data packet processed by the information processor.

The data packet shown in FIG. 2 comprises a destination field, a data 1 field, and a data 2 field. The destination field stores destination information, the instruction field stores instruction information, and the data 1 field or the data 2 field stores operand data.

The information processor shown in FIG. 1 comprises a program storing portion 1, a paired data detecting portion 2, and an operation processing portion 3. A data flow program shown in FIG. 3 is stored in the program storing portion 1. The program storing portion 1 reads out destination information and instruction information in the data flow program as shown in FIG. 3, by addressing based on the destination information in the inputted data packet, respectively stores the destination information and the instruction information in the destination field and the instruction field in the data packet, and outputs the data packet. The paired data detecting portion 2 queues the data packet outputted from the program storing portion 1. That is, it detects different two data packets having the same destination information, stores operand two data in one of the data packets out of the data packets, for example, the content of the data 1 field shown in FIG. 2 in the data 2 field in the other data packet, and outputs the other data packet. The operation processing portion 3 performs operation processing based on the instruction information with respect to the data packet outputted from the paired data detecting portion 2, stores the result in the data 1 field in the data packet and outputs the data packet to the program storing portion 1.

Meanwhile, the program storing portion 1 and the paired data detecting portion are coupled to each other by two data transmission paths 4. The data transmission paths 4 are coupled to two input ports of the paired data detecting portion 2. The data packet outputted from the program storing portion 1 is selectively inputted to either one of the input ports of the paired data detecting portion 2 depending on whether the operand data is right operand data or left operand data in the operation processing. In addition, the paired data detecting portion 2 and the operation processing portion 3 are coupled to each other by a transmission path 5, and the operation processing portion 3 and the program storing portion 1 are coupled to each other by a transmission path 6.

The data packet circulates through the program storing portion 1, the paired data detecting portion 2, and the operation processing portion 3 in that order, so that operation processing based on the data flow program stored in the program storing portion 1 progresses.

Meanwhile, in the above described paired data detecting portion 2, paired data are detected according to a so-called template matching system. Conventionally, as this template matching system, the following are known: a system of performing processing in a hardware manner using a semiconductor memory device (associative memory) having an associative function, and a system of performing processing in a software manner using a general-purpose memory and a large capacity external memory.

Conventionally, as a semiconductor memory device having an associative function, a semiconductor memory device has been known which is disclosed in, for example, Technical Report of Institute of Electronic and Communication Engineers of Japan (1983) SSD 83-78, pp. 45-52. The semiconductor memory device is a so-called logic-in memory comprising a plurality of memory cells each having a collating and comparing circuit. The logic-in memory as described in the above described document, in which all the memory cells determine collation, is also referred to as a full-associative memory. The full-associative memory comprises a memory cell array having a plurality of memory cells arranged in rows and columns. In the full-associative memory, all the memory cells have a function of determining collation, so that a search along a word direction (row direction) in the memory cell array, and a search along a bit direction (column direction) can be made based on an input of a key word. More specifically, complete determination of collation along the word direction and the bit direction is made.

Thus, in the full-associative memory, complete determination of collation can be made while the area of a unit memory cell is increased. Therefore, the area of the full-associative memory shown in the above described document is increased by approximately six times that of a general-purpose dynamic memory having the same storage capacity.

Additionally, if complete determination of collation is not required, that is, partial determination of collation or determination of collation depending on the condition is made, it becomes redundant to have comparing logic circuits for determination of collation in all the memory cells. Therefore, it is not economic as a semiconductor device.

Thus, if the template matching system is achieved using the associative memory, there is a problem in that it is difficult to configure a large-scale system to a small size, at a low cost.

On the other hand, a case, in which the template matching system is achieved in a software manner without using a special memory, such as the associative memory is superior to a case using the associative memory in terms of memory capacity and economy. On the contrary, the search time of data is greatly fluctuated depending on the value and the content of data. Therefore, another problem occurs in that it is difficult to perform matching processing of all data at a constant processing time, and either the processing speed is reduced or the processing efficiency is decreased.

SUMMARY OF THE INVENTION

An object of the present invention is to provide a small-sized and low-cost data processor having excellent speed performance.

Another object of the present invention is to provide a data processor particularly applied to a paired data detecting portion in a data flow type information processor.

In the present invention, an addressing type general-purpose memory (a memory of a type of reading out or writing data by addressing) such as an SRAM and a DRAM is employed so that memory capacity per unit area is made larger, as compared with that of an associative memory, whereby the device is minimized in size and the cost is reduced. Furthermore, matching processing is performed by a hardware circuit, so that high-speed processing is achieved. More specifically, there are provided a pre-detecting portion for performing pre-processing of template matching and a template matching portion for performing main processing of the template matching based on the result of processing in this pre-detecting portion. The pre-detecting portion compares and determines the relationship between data which reach simultaneously or close to each other on a time basis, adds the result of the determination to the data as a flag, and sends out the same to the template matching portion in the succeeding stage. The template matching portion comprises an addressing type general-purpose memory. Data which has already been inputted but has not been matched yet is written into this general-purpose memory so as to queue data to be paired with each other. The template matching portion accesses the general-purpose memory based on the inputted data, and performs matching processing for detecting the paired data. If matching is achieved in the pre-detecting portion, it is adapted such that access of the general-purpose memory is not made in the template matching portion. Thus, the frequency of access of the general purpose memory in the template matching portion can be lowered, so that the processing speed is improved.

The foregoing and other objects, features, aspects and advantages of the present invention will become more readily apparent from the following detailed description of the present invention when taken in conjunction with the accompanying drawings.

DESCRIPTION OF THE PREFERRED EMBODIMENTS

Figure 1:
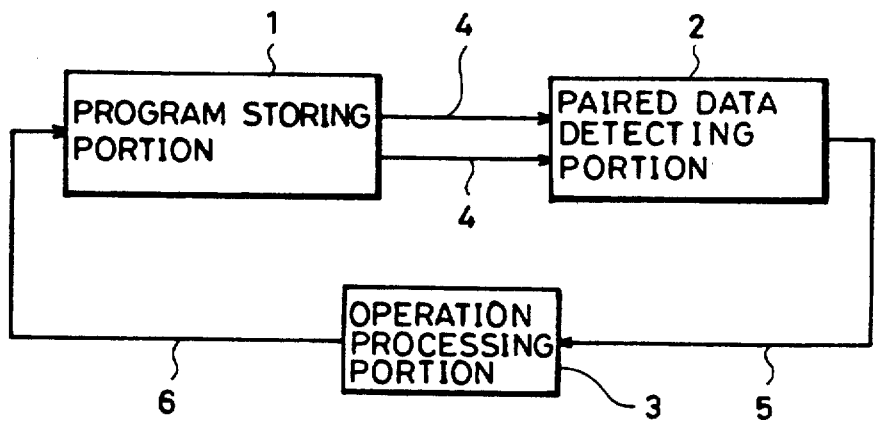
FIG. 1 is a block diagram showing one example of a structure of a conventional data flow type information processor to which the present invention can be applied.
Figure 2:
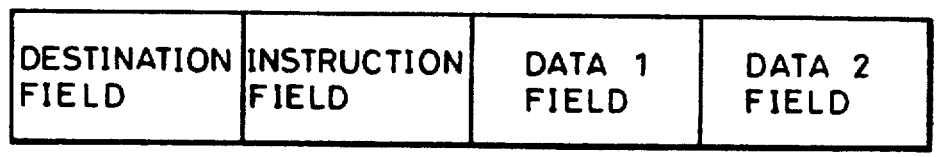
FIG. 2 is diagram showing one example of a field structure of a data packet processed by the information processor shown in FIG. 1.
Figure 3:
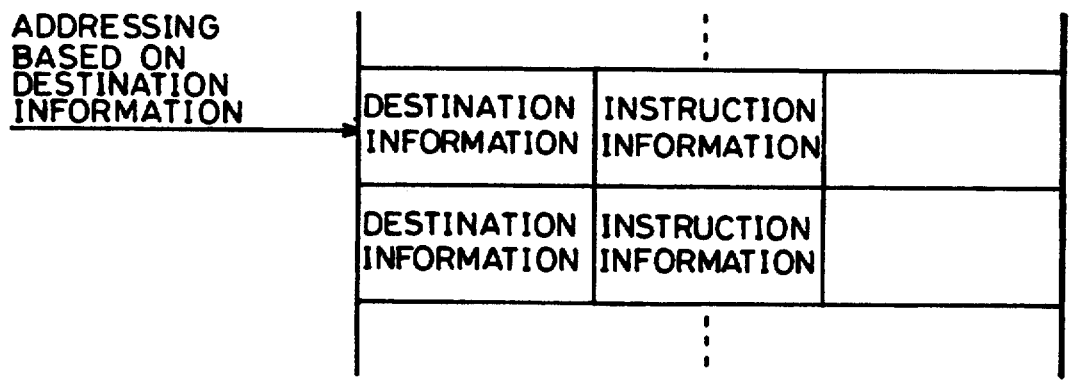
FIG. 3 is a diagram showing a data flow program stored in a program storing portion 1 shown in FIG. 1.
Figure 4:
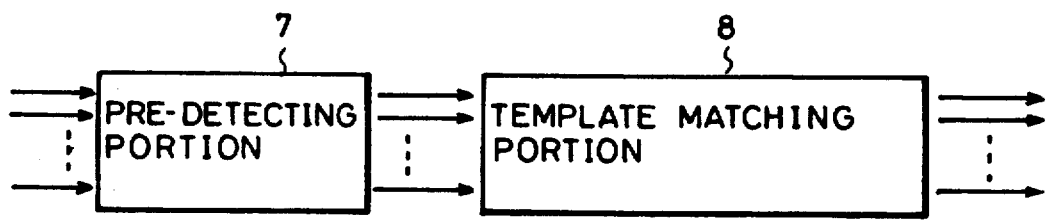
FIG. 4 is a block diagram showing a structure in one embodiment of the present invention.
Figure 5:
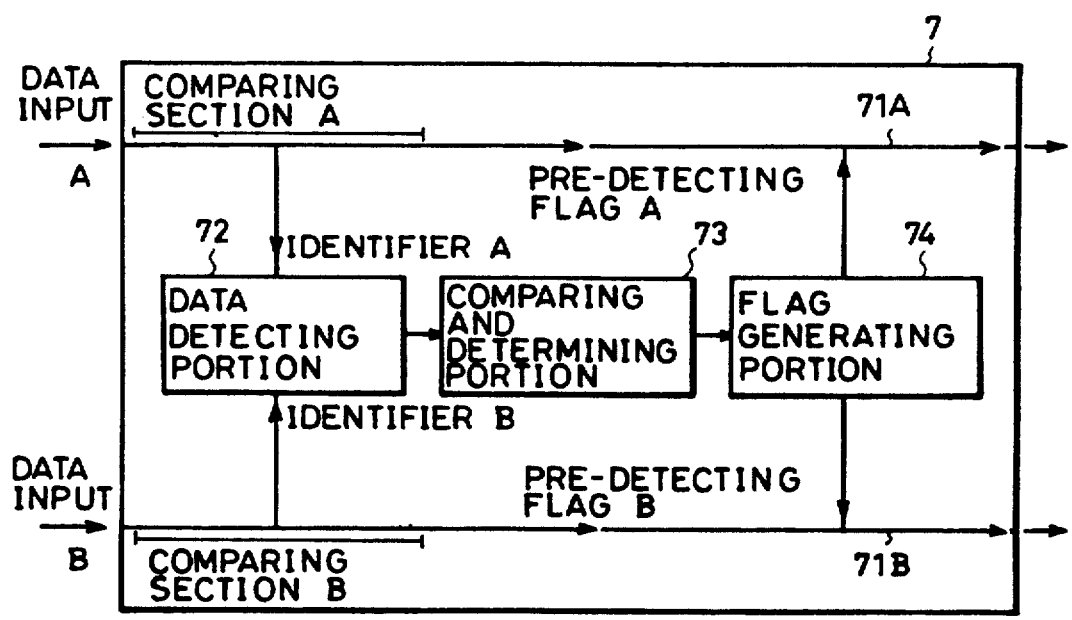
FIG. 5 is a block diagram showing simply an internal structure of a pre-detecting portion 7 shown in FIG. 4.
Figure 6:
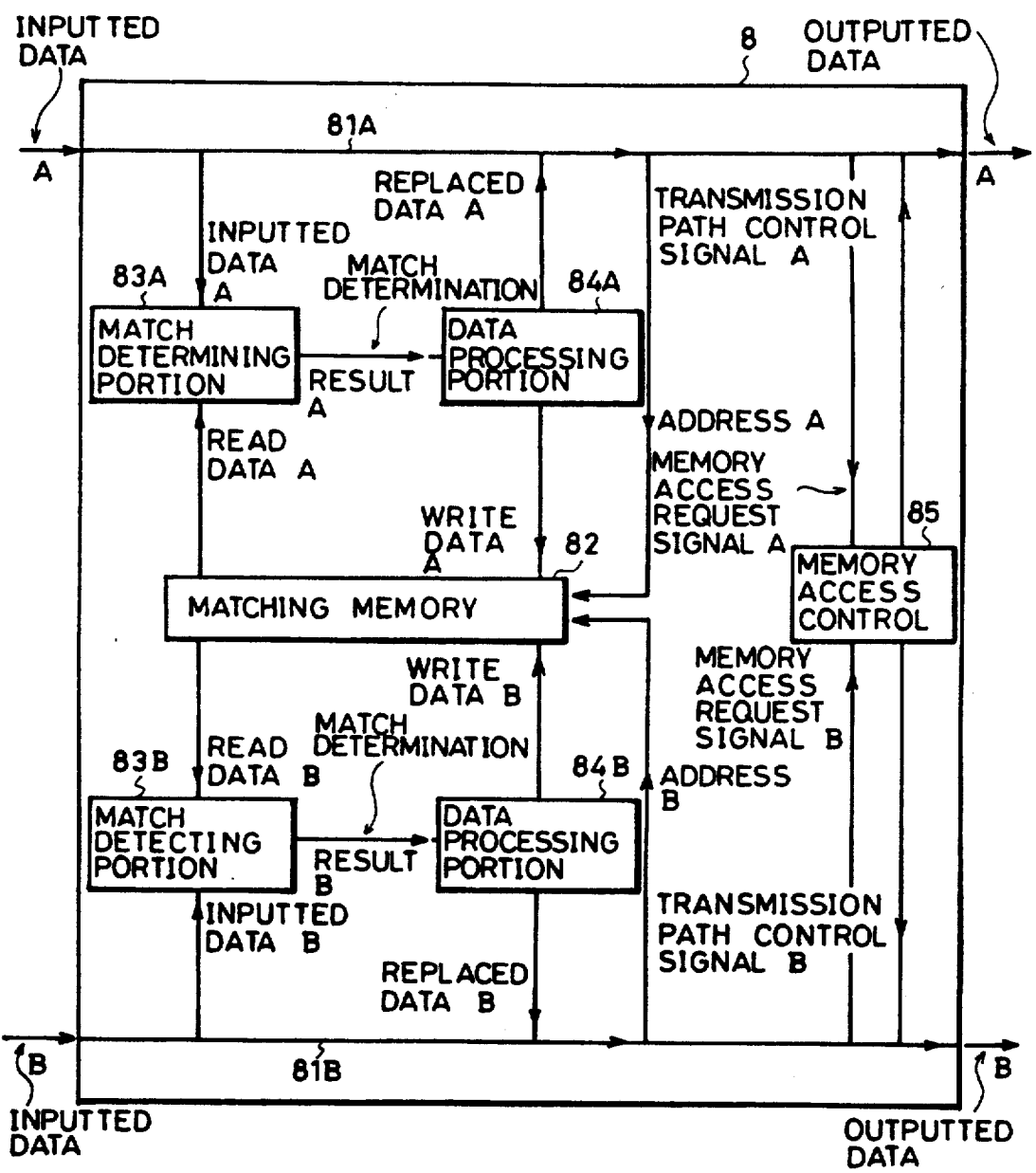
FIG. 6 is a block diagram showing simply an internal structure of a template matching portion 8 shown in FIG. 4.

FIG. 4 is a block diagram showing a structure in one embodiment of the present invention. As shown in the figure, a data processor according to the present embodiment comprises a pre-detecting portion 7 and a template matching portion 8. FIG. 5 is a block diagram showing a structure in one embodiment of a case of a two-parallel type pre-detecting portion 7. As shown in the figure, the pre-detecting portion 7 comprises data transmission paths 71A and 71B, a data detecting portion 72, a comparing and determining portion 73, and a flag generating portion 74. FIG. 6 is a block diagram showing a structure in one embodiment of a case of a two-parallel type template matching portion 8. As shown in the figure, the template matching portion 8 comprises data transmission paths 81A and 81B, a matching memory 82, coincidence determining portions 83A and 83B, data processing portions 84A and 84B, a memory access control portion 85. Meanwhile, as the matching memory 82, an addressing type general-purpose memory is used. The addressing type general-purpose memory is a memory, such as an SRAM and a DRAM, of a type for reading out data or writing in data by addressing. The data transmission paths 71A, 71B, 81A and 81B are data transmission path constructed by shift registers in a plurality of stages of transfer which is controlled by a common clock and in which data can be held, or data transmission path constructed by a self-synchronization type buffer storage mechanism according to handshaking transfer control.

In the pre-detecting portion 7, the data detecting portion 72 detects, with respect to data inputted to the data transmission path 71A or 71B, a period during which identifiers of the data simultaneously exist in an identifier comparing section A or B on the opposed data transmission paths, the comparing and determining portion 73 compares the identifiers in the above described period, to transmit the result of the comparison to the flag generating portion 74. Thus, the flag generating portion generates a flag, based on the result of the comparison. The above described flag obtained by the flag generating portion 74, is added to the data transmitted through the data transmission paths 71A and 71B.

Outputs of the data transmission paths 71A and 71B in the pre-detecting portion 7 and inputs of the data transmission paths 81A and 81B in the template matching portion 8 are respectively connected to each other. In the template matching portion 8, the following processing is performed with respect to the data having the above described flag added in the pre-detecting portion 7 and inputted to the data transmission path 81A or 81B. More specifically, if the above described flag indicating that data having identifiers matching each other exist in the opposed data transmission paths 81A and 81B is added to the inputted data, the data is made to wait until the data having identifiers matching each other arrives at the opposed data transmission paths 81A and 81B. Immediately after arrival, both the data are combined, to be outputted. In addition, if the above described flag indicating that access contention to the matching memory 82 occurs between inputted data in the opposed data transmission paths and the priority of the data is lower, is added to the inputted data, the data is made to wait without making access to the matching memory 82 until a queuing region in the matching memory 82, allocated to the data is emptied. In addition, if data other than the above described data is inputted, data in the queuing region in the matching memory 82 corresponding to the identifier of the data is read out, and the identifiers of the data, and the data as read out, are compared with each other by the match determining portions 83A and 83B. In the data processing portions 84A and 84B, if the result of determination of a match of the identifiers by the above described match determining portions 83A and 83B indicates a match, both the data are combined, to be outputted, so that the queuing region in the matching memory is emptied. If the above described result of the determination of a match indicates a mismatch, access contention occurs between the data. Thus, higher-priority data is written into the matching memory 82 so that the data is made to wait in the queuing region while the other data is made to wait until the queuing region is emptied. If and when the queuing region is emptied, the data is written, so that queuing is performed.

In the memory access control portion 85, in a period during which memory access is made in response to a memory access request, memory access by another data is made to wait in response to transmission path control signals A and B, so that a plurality of times of memory access are avoided being simultaneously made. Access to a matching memory is made in the order of reading and writing with respect to data inputted to the same transmission path 81A or 81B, and reading is not carried out until writing of the previous data is terminated with respect to continuously inputted data.

According to the above described embodiment shown in FIGS. 4 to 6, a plurality of identifiers is caused to correspond to a single address in the matching memory 82, so that memory capacity as a queuing region can be reduced.

Additionally, identifiers of data between opposed data transmission paths are compared with each other by the pre-detecting portion 7 and a determination flag is added. Thus, when the above described flag of the data in the template matching portion 8 indicates a match of the identifiers, and when the data access the same memory address and the priority is low, access to the above described matching memory 82 is not made so that the frequency of memory access can be reduced. When first reading by one data is performed between different data transmission paths and then, second a reading by the other data is performed, before writing is performed and access contention occurs between the data, it cannot be said that the second data read out later is right. Thus, also in the case of the above described input condition, access contention can be detected by the above described determination flag, and contradiction can be avoided by making wait access to the above described matching memory 82 with respect to the lower-priority data.

The present invention will be apparent, more specifically, by describing structures of the above described pre-detecting portion and template matching portion in more detail.

DETAILS OF PRE-DETECTING PORTION

Figure 7:
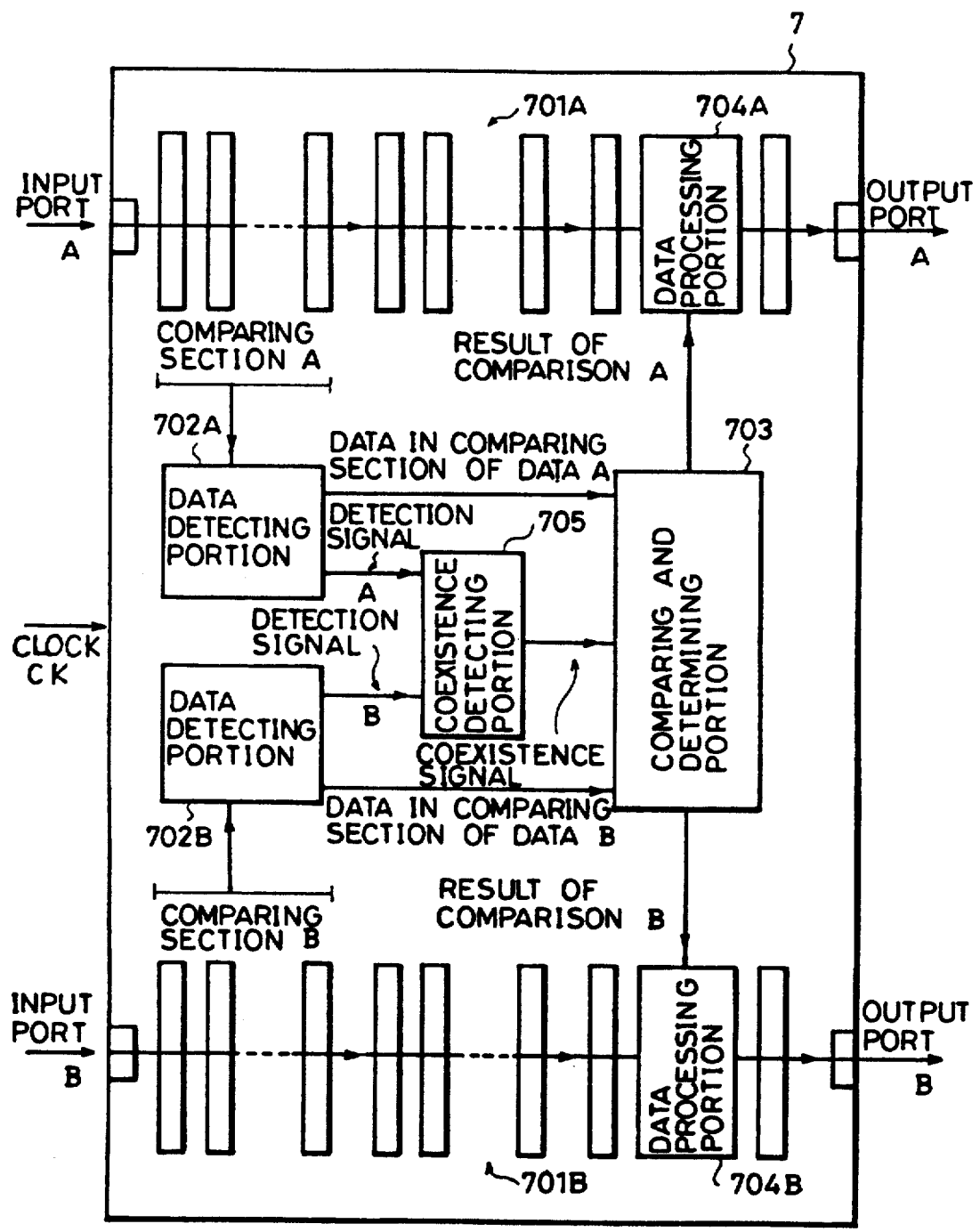
FIG. 7 is a block diagram showing a structure in one embodiment of a pre-detecting portion having two input ports and two parallel data transmission paths.

FIG. 7 is a block diagram showing a structure in one embodiment of a pre-detecting portion having two input ports and two parallel data transmission paths. As shown in the figure, this pre-detecting portion comprises data transmission paths 701A and 701B, data detecting portions 702A and 702B each having a function of detecting the fact that data exists in a finite section on the data transmission path, a comparing and determining portion 703 having a function of comparing two identifiers each comprising a part or all of data to be inputted for identifying the data and determining the result of the comparison, data processing portions 704A and 704B each having a function of processing two data to be inputted in accordance with the result of the determination by the above described comparing and determining portion 703, and a coexistence detecting portion 705 having a function of detecting the fact that data simultaneously exist in comparing sections on the above described two data transmission paths. The data transmission paths 701A and 701B are lines each constructed by shift registers in a plurality of stages, transfer of which is controlled by a common clock CK and capable of holding data, the data being transmitted at a rate peculiar to the data transmission path. A period during which the data passes through the comparing section A or B is detected by the data detecting portion 702A or 702B, a part or all of the data (i.e. data of an identifier) required for comparison is extracted and held in the corresponding data detecting portion 702A or 702B, and comparison is made by the comparing and determining portion 703. If and when the coexistence detecting portion 705 detects the fact that there is a common period in periods during which the data detected by the data detecting portions 702A and 702B stay in the above described comparing sections on the data transmission paths, namely, the data simultaneously exist in the above described comparing sections A and B, processing are performed in the data processing portions 704A and 704B using the result of the comparison by the comparing and determining portion 703. The respective numbers of stages of the data transmission paths are made coincident with each other such that the time required for comparing and determining the above described data becomes equal to the time when the data is transmitted from the comparing section A or B. Therefore, in accordance with the result of the comparison by the comparing and determining portion 703, the data, as transmitted, can be processed by the data processing portion 704A or 704B provided between the stages of the data transmission path. If the time required for processing data is shorter than the inherent transmission time of the data transmission path, the data can be processed without disturbing transmission of the data. On the other hand, if the time required for processing data is longer than the inherent transmission time of the data transmission path, a function element of the processing is divided and arranged such that the time required for the processing falls below the inherent time of the data transmission path, to perform processing in a pipeline manner, whereby the data can be processed without disturbing transmission of the data.

Figure 8:
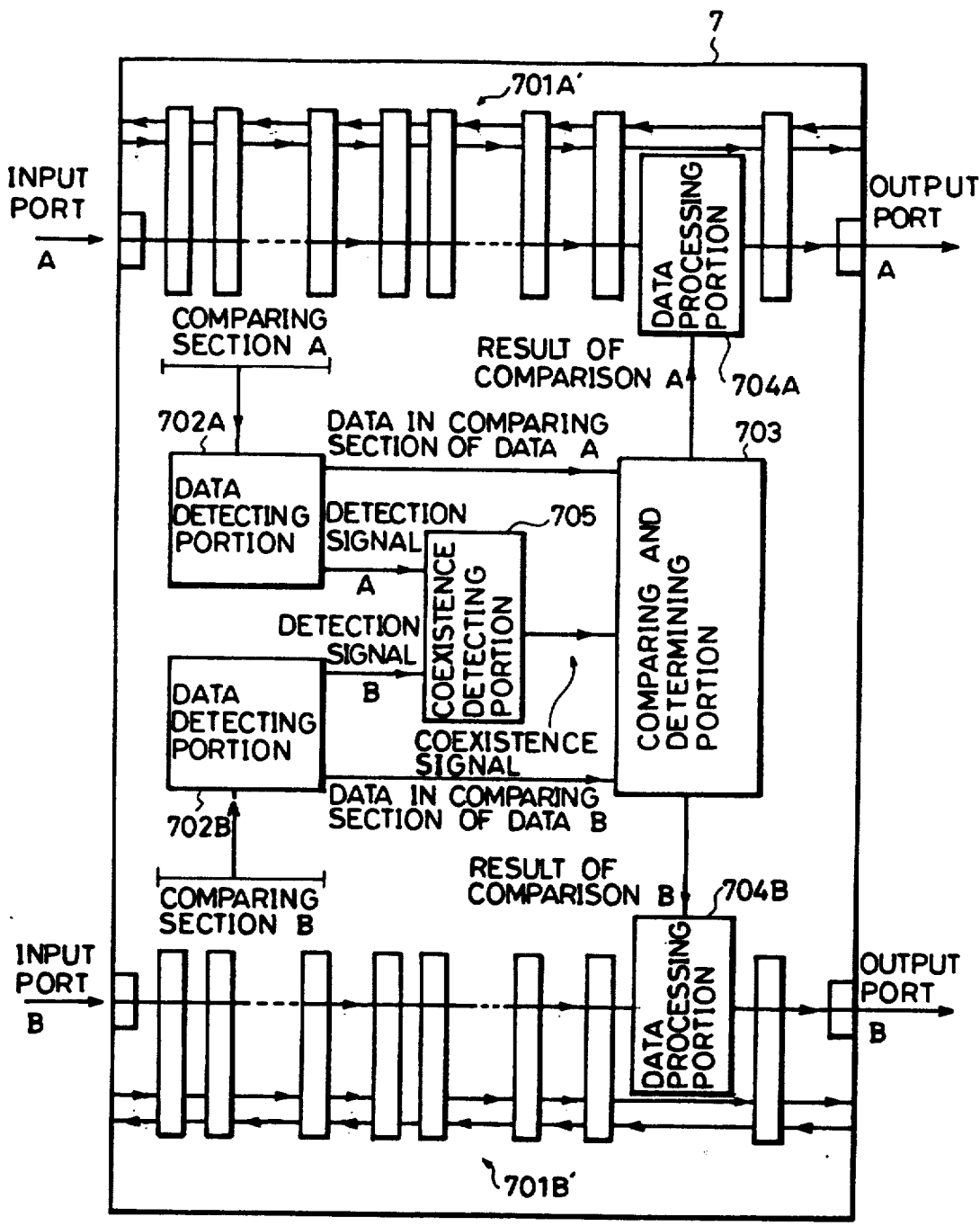
FIG. 8 is a block diagram showing a structure in another embodiment of a pre-detecting portion having two input ports and two parallel data transmission paths.
Figure 9:
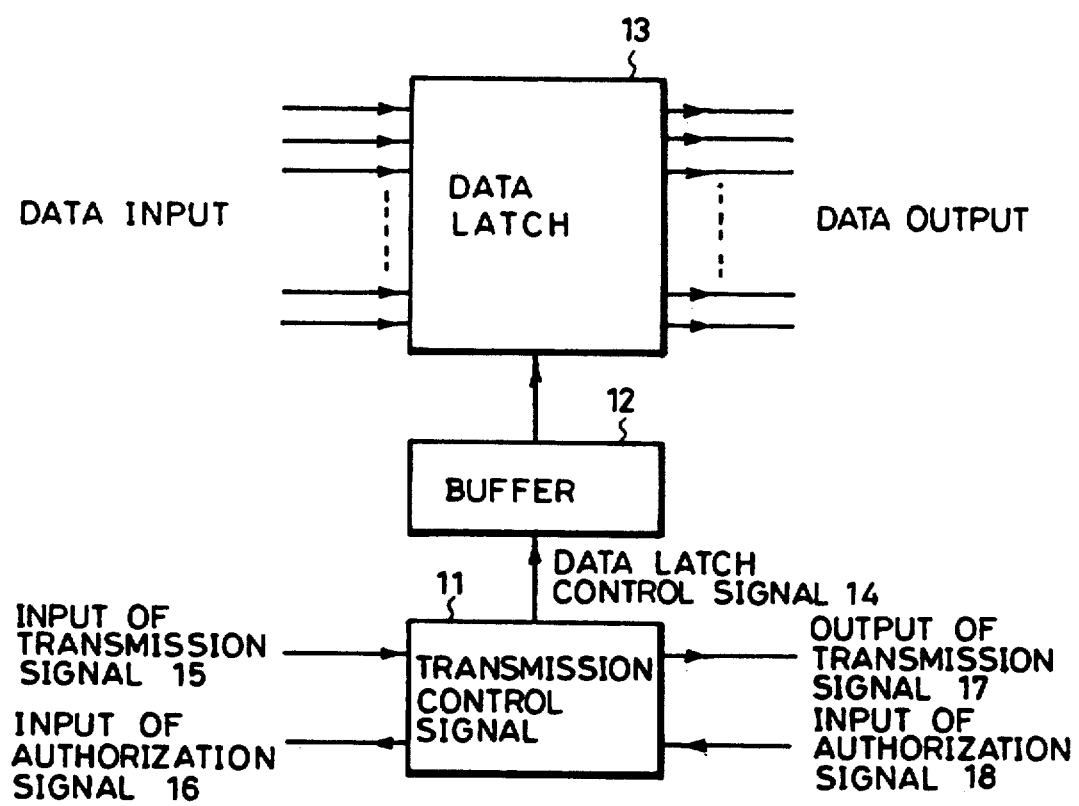
FIG. 9 shows a self-synchronization type buffer storage mechanism according to handshaking transfer control in one embodiment of a transmission control circuit employed in the data transmission paths shown in FIG. 8.

FIG. 8 is a block diagram showing a structure according to another embodiment of a pre-detecting portion having two input ports and two parallel data transmission paths. The difference from the first embodiment shown in FIG. 7 is that data transmission paths 701A' and 701B' are constructed by a self-synchronization type buffer storage mechanism according to handshaking transfer control as shown in FIG. 9. Thus, fluctuations in dynamic and local transfer rate can be absorbed. In the present embodiment, a transmission signal and an authorizing signal for handshaking control are sent and received between stages of the transmission paths. However, a function and an operation as a data processor are all the same as those in the first embodiment shown in FIG. 7.

In the case in which three or more data transmission paths are provided in parallel in the pre-detecting portion, the same processing as that in the case of the above described two-parallel type with respect to a combination of any arbitrary two data transmission paths, out of the plurality of data transmission paths. In addition, with respect to data transmitted through three or more data transmission paths out of the plurality of data transmission paths, a coexistence detecting portion 705 and a comparing and determining portion 703 deal with three or more data, so that the data can be processed in the similar system.

FIG. 9 shows one embodiment of a transmission control circuit used in the data transmission paths 701A' and 701B' shown in FIG. 8, showing a self-synchronization type buffer storage mechanism according to handshaking transfer control. Each of the data transmission paths 701A' and 701B' is structured by successively connecting the above described self-synchronization type buffer storage mechanisms in a plurality of stages. In FIG. 9, a transmission control element 11 performs handshaking with a transmission control element in the self-synchronization type buffer storage mechanisms connected in front and behind, transmission signals 15 and 17 and authorizing signals 16 and 18, to generate a data latch control signal 14 in accordance with the state of a transmission control element connected to the next stage. A buffer 12 is a circuit for operating a data latch 13 in response to the data latch control signal 14. The data latch 13 is constructed by at least one data holding mechanism, holding and passing of data are controlled by the data latch control signal 14. Although the data processor shown in FIGS. 7 and 8 is suitable for a pre-detecting portion in a paired data detecting portion in a data flow type information unit, it is limited to the same. Furthermore, it can be widely employed in the whole data processing system in which asynchronous data are inputted in parallel, to perform processing for comparison and determination between the inputted data.

DETAILS OF TEMPLATE MATCHING PORTION

Figure 10:
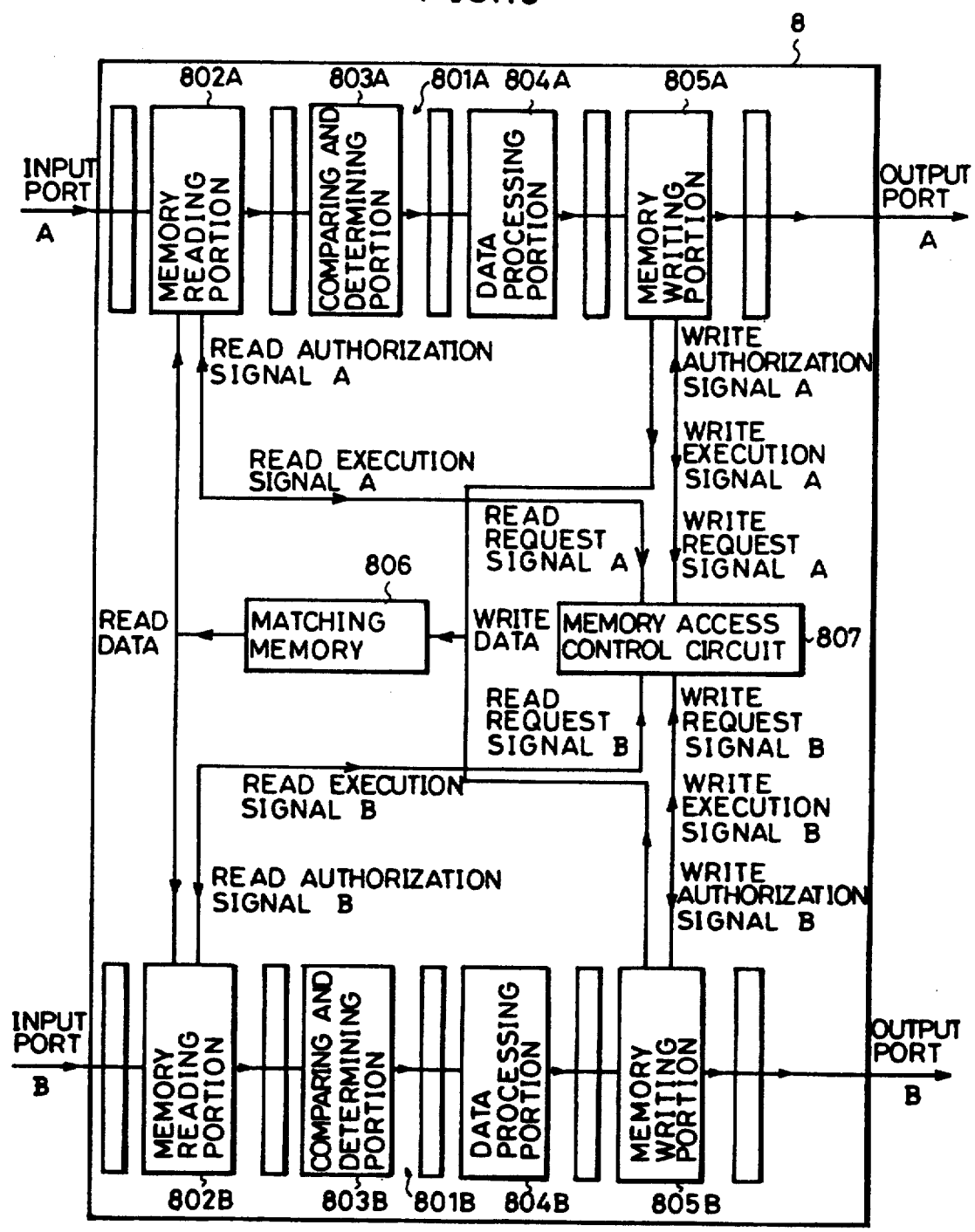
FIG. 10 is a block diagram showing a structure in one embodiment of a template matching portion having two input ports and two parallel data transmission paths.

FIG. 10 is a block diagram showing a structure of one embodiment of a template matching portion having two input ports and two parallel data transmission paths. As shown in the figure, this template matching portion comprises data transmission paths 801A and 801B, memory reading portions 802A and 802B, comparing and determining portions 803A and 803B, data processing portions 804A and 804B, memory writing portions 805A and 805B, a matching memory 806, and a memory access control circuit 807. The data transmission paths 801A and 801B are a data transmission path constituted by, for example, shift registers in a plurality of stages, the transfer of which is controlled by a common clock and is capable of holding data or a data transmission path constituted by a self-synchronization type buffer storage mechanism, according to handshaking transfer control, a data holding mechanism (data latch) constituting the data transmission path being controlled by the common clock or a transmission control signal generated by the above described self-synchronization type buffer storage mechanism, by control of the above described data transmission paths. Meanwhile, as the self-synchronization type buffer storage mechanism, one shown in, for example, FIG. 9 is used.

With respect to data inputted to the data transmission path 801A or 801B, the memory reading portion 802A or 802B reads out from the matching memory 806 data in an address corresponding to an identifier comprising a part or all of the data for identifying the data. The comparing and determining portion 803A or 803B compares the identifiers of the data read out from the matching memory 806 by the above described memory reading portion 802A or 802B and the inputted data and determines the relation between the data. If and when the above described identifiers of the packet data exist in a first word, first words are compared with each other and determined, so that the result of the comparison and determination is held until the first word of the next packet data reaches the comparing and determining portion. The data processing portion 804A or 804B performs processing, for example, changes a part or all of each data based on the result of determination obtained by the above described comparing and determining portion 803A or 803B and replaces the inputted data with the content of the data read out from the above described matching memory 806, to further send out each data processed based on the result of the processing to a predetermined data transmission path. Furthermore, the memory writing portion 805A or 805B writes any one of the above described data into an address corresponding to the identifier of the data in the above described matching memory based on the above described result of the determination or erases data in an address corresponding to the identifier of the data in the above described matching memory 806.

The above described series of pipeline processing is sequentially performed with respect to one input data, so that there is no contention of memory access requests. However, if and when data are successively inputted to the same data transmission path or inputted in parallel to different data transmission paths, there is contention of the memory access requests. The memory access control circuit 807 applies a memory access authorizing signal (reading authorizing signal A/B or writing authorizing signal A/B) to only one portion within the memory access portion in the memory reading portions 802A and 802B and the memory writing portions 805A and 805B, to authorize memory access. With respect to authorization of memory access, a memory access portion in which a memory access request is generated is given priority. When there is contention between a plurality of memory accesses, the memory access portion 802A, 802B, 805A or 805B in which a memory access request is earliest generated is given priority. The memory access portion in which memory access is authorized generates a memory access executing signal (reading executing signal A/B and writing executing signal A/B) indicating a period during which a memory is accessed, and does not authorize memory access in another memory access portion during the memory access period while authorizing memory access in a memory access portion in which another memory access request is generated immediately after memory access being executed is terminated. Thus, the data transmission paths are controlled by the memory access authorizing signal in a period during which memory access is made in response to the memory access request so that memory access by another data is made to wait, whereby a plurality of memory accesses are avoided as being simultaneously made.

Figure 11:
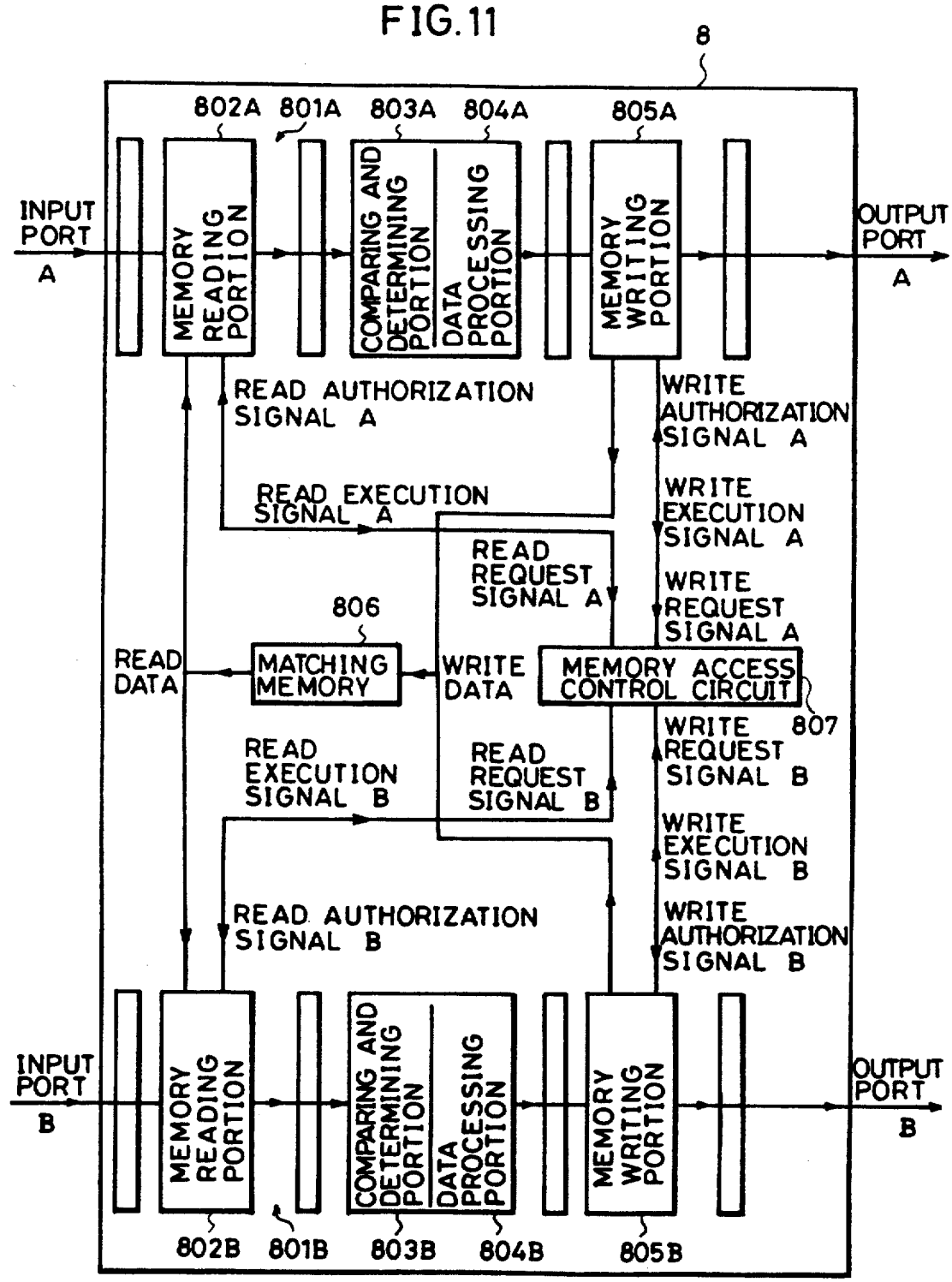
FIG. 11 is a block diagram showing a structure in another embodiment of a template matching portion.

FIG. 11 is a diagram showing a structure in a case in which the comparing and determining portion 803A and the data processing portion 804A or the comparing and determining portion 803B and the data processing portion 804B as shown in FIG. 10 are respectively executed in the same pipeline stage. Thus, a structure can be arbitrarily achieved depending on the execution time of pipeline processing in which a plurality of pipeline processings are performed in a single pipeline stage in the range which falls in the transmission delay time per stage of the data transmission path, and processing which does not fall in the transmission delay time per one stage is divided into a plurality of pipeline stages.

According to the above described embodiment shown in FIGS. 10 and 11, the execution time of pipeline processing of each circuit provided on a data transmission path falls below the transmission delay time per one stage of the data transmission path, so that data transmission is not disturbed as long as memory accesses are not overlapped with each other, whereby data can be inputted from an input port at a time interval determined by the capability of the data transmission path. In addition, even when the memory accesses are overlapped with each other, the data transmission path is controlled by the memory access control circuit 807, so that memory access is made to wait until the memory access being executed is terminated, whereby contradiction does not occur in processing. Furthermore, data requesting memory accesses are inputted in parallel, so that the memory accesses can be densely made, as compared with a system of making memory access by data from the conventional single input.

Figure 12:
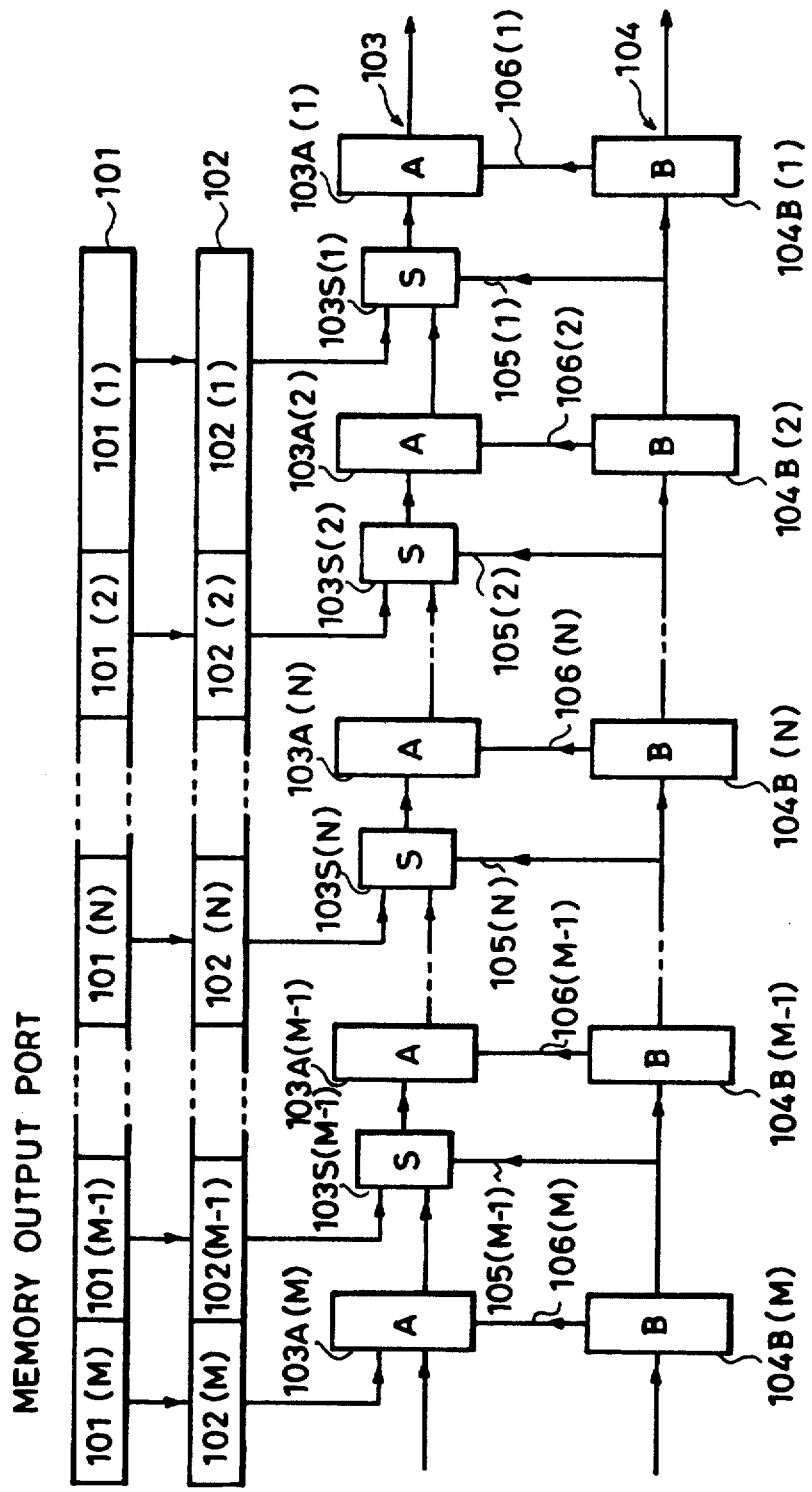
FIG. 12 is a diagram showing a structure in one embodiment of memory reading portions 802A and 802B shown in FIG. 10 (or FIG. 11)

FIG. 12, is a diagram showing a structure of one embodiment of the memory reading portions 802A and 802B shown in FIG. 10 (or FIG. 11). Description is made on an operation to occur when word data of M words constitute a packet data and $1 \leq N \leq M$. Reading of data from a matching memory 63 is completed before a leading word (first word) is held in a data latch 104B (1), so that data from a memory output port 101 is determined. However, if and when data from a memory output port 101 (N) is held until the word data of the N-th word is held in a data latch 104B (N), a data latch 102 (N) can be omitted.

Switches 103S each have a function of allowing passage of one input of the two input data by a control signal 105. The above described respective switches are controlled by data held in a data transmission path 104. For example, memory data corresponding to the N-th word of the packet data is held in the data latch 101 (N) or 102 (N). When the packet data in the N-th word is held in a data latch 104B (N+1), a switch 103S (N) allows the passage of data in the data latch 102 (N) according to information identifying a word of the word data while operating to allow the passage of a data latch 103A (N+1) at the other time, so that memory data is held in a data latch 103A (N) at timings at which the word data is held in 104B (N). The above described method is used with respect to all word data in the packet data. Data held in the data latch 102 is held at the same timings as those of corresponding word data in the inputted packet data transmitted through the data transmission path 104 in response to the control signal 106, to be sent out to a data transmission path 103 by a function of the above described switch 103S. Considering a case in which the above described identifier exists in the first word in the packet data, if reading from the matching memory 806 is performed in the transmission time between stages when the first data is transmitted from the data latch 104B (2) to 104B (1) and the read data is held in the data latch 102 at timings at which the first word is held in the data latch 104B (1), reading from the matching memory 806 is completed in the transmission delay time per one stage of the data transmission path. In this case, the reading authorizing signal from the memory access control circuit 807 controls the passage of the first word through the data latch 104B (2).

Figure 13:
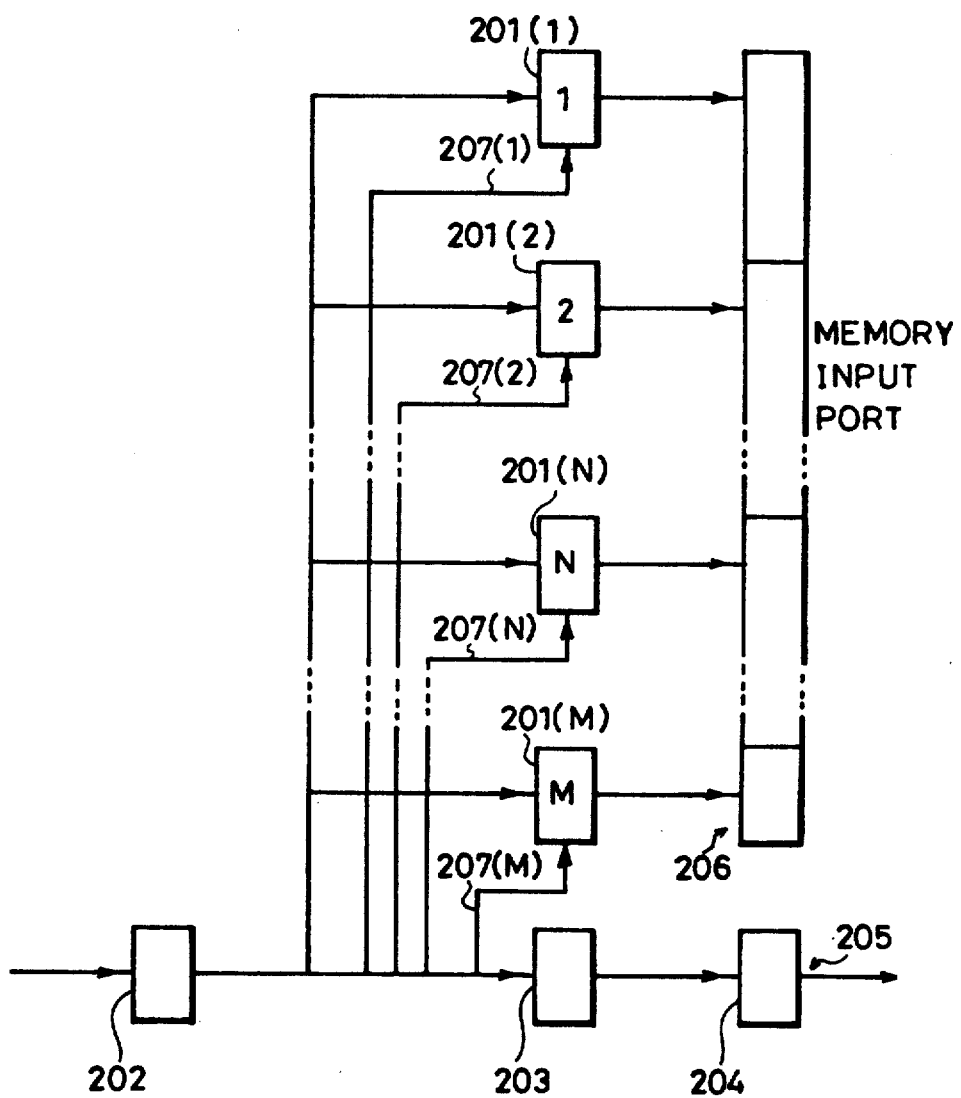
FIG. 13 is a diagram showing a structure in one embodiment of memory writing portions 805A and 805B shown in FIG. 10 (or FIG. 11)

FIG. 13 is a diagram showing a structure of one embodiment of the memory writing portions 805A and 805B shown in FIG. 10 (or FIG. 11). Description is now made on an operation to occur when word data of M words constitute packet data, $1 \leq N \leq M$, all the word data in the packet data are held at the same timings in a data latch transmission of which is controlled and the data are written into a matching memory 806. For example, when word data corresponding to the N-th word in the packet data is held in a data latch 202, the word data is also held in a data latch 201 (N) by a data latch control signal 207 (N) generated from information identifying the word of the word data at timings at which the word data is held in a data latch 203. The above described control is performed with respect to all the word data in the packet data transmitted through a data transmission path 205. When each of the word data is held in the data latch 203, the word data is held in the corresponding data latch out of data latches 201. When the M-th word, which is the last word, is held in the data latch 203, the entire packet data is held in the corresponding data latches out of the data latches 201. These held data start to be written into the above described matching memory 806 at timings at which the M-th word data is held in the data latch 203. If the data in the data latches 201 are written into the matching memory 806 before the M-th word is held in a data latch 204, writing processing is completed at the transmission delay time per one stage of the data transmission path. In this case, the writing authorizing signal from the memory access control circuit 807 controls the passage of the M-th word through the data latch 203.

Figure 14:
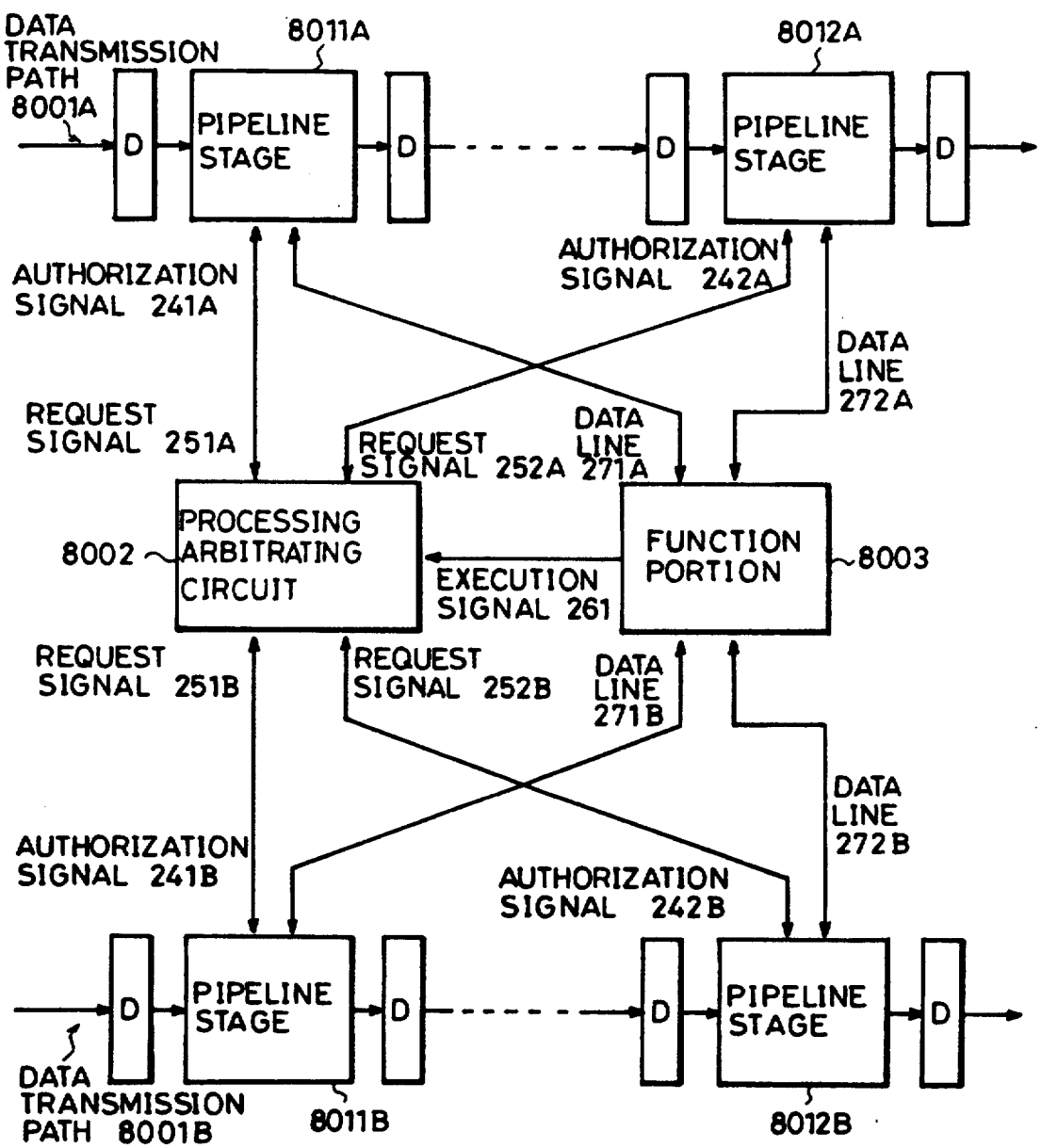
FIG. 14 is a block diagram showing a structure in still another embodiment of a template matching portion.

FIG. 14 is a block diagram showing a structure in still another embodiment of a template matching portion having two input ports and two parallel data transmission paths. As shown in the figure, this template matching portion comprises data transmission paths 8001A and 8001B, a processing arbitrating circuit 8002, and a function portion 8003. The data transmission paths 8001A and 8001B are each constituted by data holding mechanisms D such as data latches in a plurality of stages which are successively connected to each other. Transmission of data through the data holding mechanisms is controlled by an external clock. A control signal generated by a control circuit according to handshaking transfer control, or the like. On each of the above described data transmission paths 8001A and 8001B, there are respective two pipeline stages 8011A and 8012A and 8011B and 8012B which perform processing such as memory access in the function portion 8003. The processing arbitrating circuit 8002 receives a processing request for the function portion 8003 by request signals 251A, 251B, 252A and 252B from the pipeline stages 8011A, 8012A and 8012B. If it determines that the above described processing is not performed in the function portion 8003 by an execution signal 261 from the function portion 8003, it authorizes execution of processing in the function portion 8003 with respect to any one of the pipeline stages 8011A and 8012A and 8011B and 8012B by authorizing signals 241A, 241B, 242A and 242B. On the other hand, if it determines that the above described processing is performed in the function portion 8003, it does not authorize execution in the function portion 8003 with respect to any pipeline stage until the processing is terminated. It is the same with a structure in which there is one data transmission path or more and there is at least one pipeline stage performing processing in the same function portion on one data transmission path.

Figure 15:
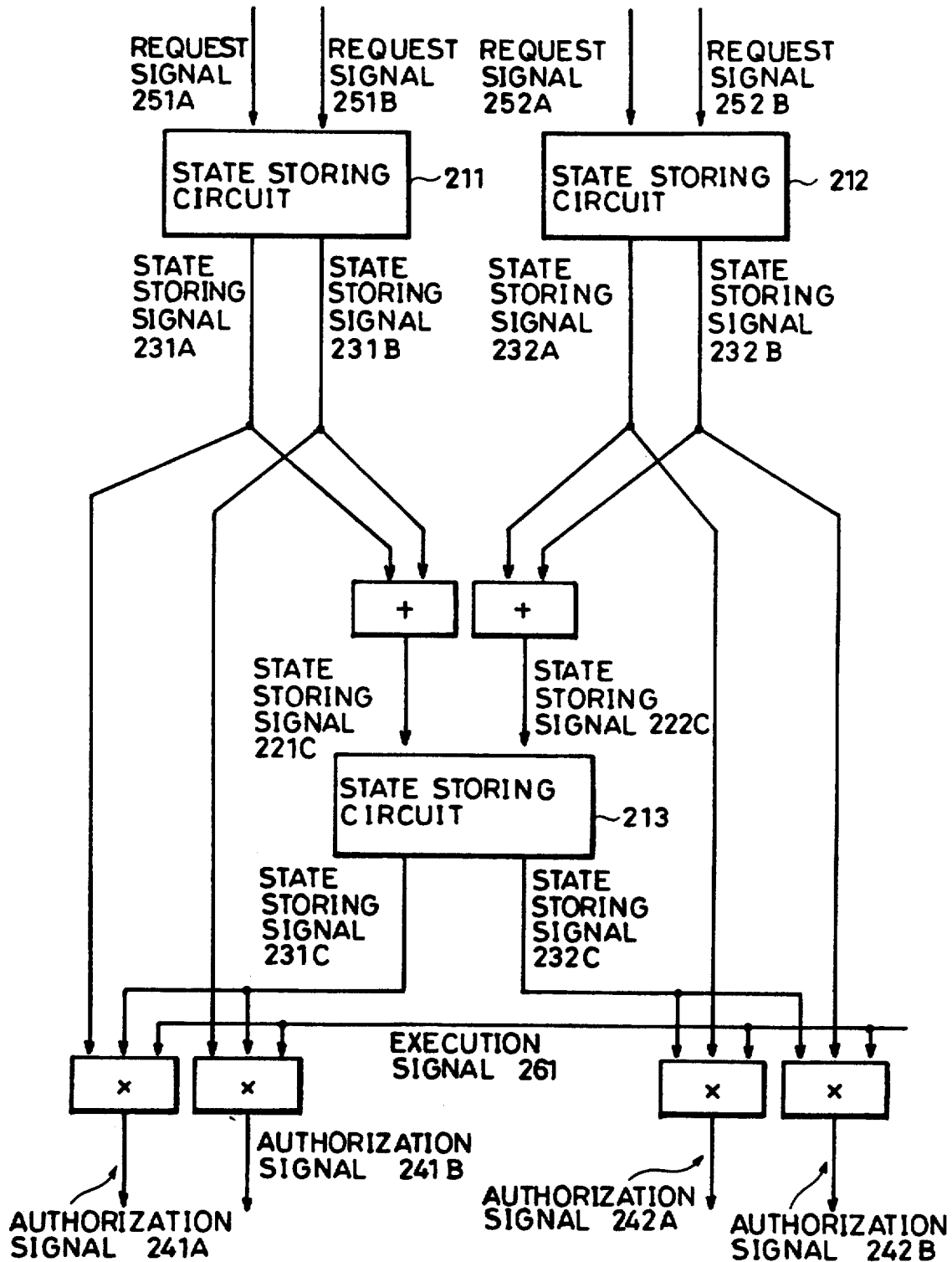
FIG. 15 is a diagram showing a structure in one embodiment of a processing arbitrating circuit 8002 shown in FIG. 14.

FIG. 15 is a diagram showing a structure according to one embodiment of the above described processing arbitrating circuit 8002 used in FIG. 14. The above described processing arbitrating circuit 8002 is constituted by a plurality of state storing circuits for storing the order of generation of processing requests. A state storing circuit 211 stores the order of generation of processing requests of the pipeline stages 8011A and 8011B, a state storing circuit 212 stores the order of generation of processing requests of the pipeline stages 8012A and 8012B, and a state storing circuit 213 stores the order of generation of processing requests of the pipeline stages 8011A or 8011B and 8012A or 8012B. In the state storing circuit 211, state storing signals 231A and 231B storing states of the processing requests are generated based on request signals 251A and 251B from the pipeline stages 8011A and 8011B. A state storing signal 221C is generated from the state storing signals 231A and 231B. In the state storing circuit 212, state storing signals 232A and 232B storing states of processing requests are generated based on request signals 252A and 252B from the pipeline stages 8012A and 8012B. A state storing signal 222C is generated from the state storing signals 232A and 232B. In the state storing circuit 213, state storing signals 231C and 232C storing states of the state storing signals 221C and 222C are generated from the state storing signals 221C and 222C. The state storing signals 231A, 231B and 231C, the state storing signals 232A, 232B and 232C, and an execution signal 261 showing an executing state of the function portion 8003 constitute authorizing signals 241A, 241B, 242A and 242B of the pipeline stages 8011A, 8011B, 8012A and 8012B. A pipeline stage in which processing in the above described function portion 8003 is authorized performs processing in the above described function portion 8003, while the other pipeline stages wait for execution from the time when execution of the authorized processing is terminated to the next authorization.

Figure 16:
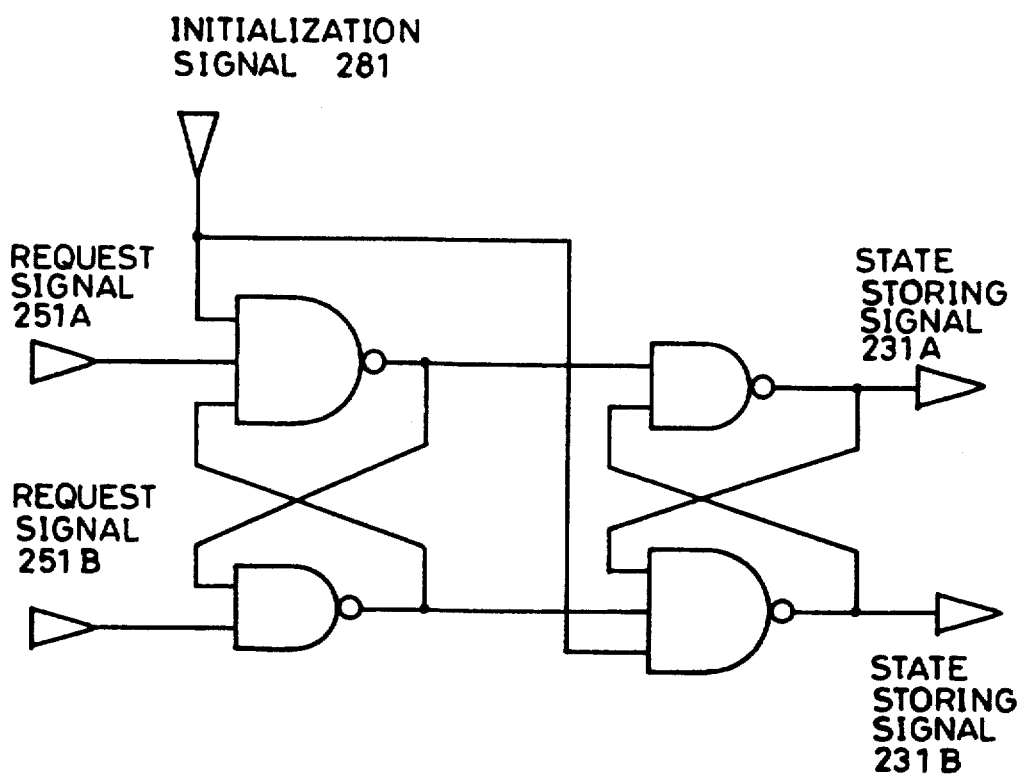
FIG. 16 is a circuit diagram in one embodiment of a state storing circuit used in the processing arbitrating circuit 8002.

FIG. 16 is a circuit diagram according to one embodiment of a state storing circuit employed in the processing arbitrating circuit 8002. Assuming that a request signal 251A or 251B is at an "L" level in a state in which a request is generated and a state storing signal 231A or 231B is at an "L" level in a state in which generation of a processing request is stored, an initialization signal 281 is brought to the "L" level and the request signals 251A and 251B are brought to an "H" level, to initialize a state storing circuit such that the state storing signal 231A is at the "L" level and the state string signal 231B is at the "H" level. When the request signal 251A is changed from the "H" level to the "L" level and the request signal 251B is at the "H" level, the state storing signal 231A attains the "H" level and the state storing signal 231B attains the "L" level. The reverse is the same. If and when the request signal 251A is changed from the "H" level to the "L" level and the request signal 251B is changed from the "H" level to the "L" level before the request signal 251A is returned again to the "H" level, the state storing signal 231A attains the "H" level and the state storing signal 231B attains the "L" level. Thus, the state storing signals 231A and 231B are not changed irrespective of the change in the request signal 251B. The reverse is the same. When both the request signals 251A and 251B are at the "L" level and the request signal 251A is changed to the "H" level, the state storing signal 231A attains the "H" level and the state storing signal 231B attains the "L" level. Although in the present embodiment, the state storing circuit is constituted by a NAND gate, it can be achieved by a NOR gate in the same structure if the plurality of a signal is inverted.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data processor comprising:
    data detecting portion having a plurality of parallel input ports and a plurality of data transmission paths subsequent to the input ports for detecting data existing in a finite section on each of the data transmission paths with respect to data transmitted through each of the data transmission paths and further including a plurality of latches, each said latch having a plurality of stages;

coexistence detecting portion for detecting data simultaneously coexisting in said data detecting section of at least three set of said data transmission paths based upon the detection of the data detecting portion;

comparing and determining portion for extracting identifiers for identifiers data from each of said data transmission paths, each said identifier including at least a portion of the data detected by said data detecting portion, and for comparing and determining the relationship between the identifiers;

data processing portion for processing the detected data by adding a signal indicating the determined relationship to the detected data and for changing at least a portion of the detected data; and output ports, subsequent to the data transmission paths, for outputting a plurality of data from the plurality of latches, wherein the plurality of data is detected and compared during data transmission with respect to inputs of at least three parallel sets of said data transmission paths, the plurality of data being processed based on the result of the comparison and detection without disturbing said data transmission.

2. A method of data processing comprising the steps of:

(a) detecting, in a data detecting portion having a plurality of parallel input ports and a plurality of data transmission paths subsequent to the input ports, data existing in a finite section of each of the data transmission paths with respect to data transmitted through each of the data transmission paths, the detecting portion further including a plurality of latches, each of the latches having a plurality of stages;

(b) detecting data simultaneously coexisting in data detecting sections of at least three sets of the data transmission paths based upon the detecting of the data detecting portion;

(c) extracting identifiers for identifying data, each of the identifiers including at least a portion of the data detected by the data detecting portion;

(d) comparing and determining the relationship between the extracted identifiers;

(e) processing the detected data by adding a signal indicating the determined relationship to the detected data and changing at least a portion of the detected data; and (f) outputting a plurality of data from the plurality of latches, wherein the plurality of data is detected and compared during data transmission with respect to inputs of at least three parallel data transmission paths, the plurality of data being processed based on the result of the comparison and detection without disturbing the data transmission.

* * * * *